United States Patent
Forsyth

(10) Patent No.: US 10,504,083 B2
(45) Date of Patent: Dec. 10, 2019

(54) FINANCIAL SERVICES CENTER ATM

(75) Inventor: Gordon Forsyth, Perth & Kinross (GB)

(73) Assignee: NCR Corporation, Atlanta, GA (US)

( * ) Notice: Subject to any disclaimer, the term of this patent is extended or adjusted under 35 U.S.C. 154(b) by 1027 days.

(21) Appl. No.: 13/413,200

(22) Filed: Mar. 6, 2012

(65) Prior Publication Data

US 2013/0238498 A1    Sep. 12, 2013

(51) Int. Cl.
| G06Q 20/18 | (2012.01) |
| G06Q 40/00 | (2012.01) |
| G07F 19/00 | (2006.01) |

(52) U.S. Cl.
CPC ............ G06Q 20/18 (2013.01); G06Q 40/00 (2013.01); G07F 19/20 (2013.01)

(58) Field of Classification Search
CPC .... G06Q 20/10; G06Q 20/1085; G06Q 40/02; G06Q 40/00
USPC ............. 705/39, 43, 42, 35, 44, 40; 235/379
See application file for complete search history.

(56) References Cited

U.S. PATENT DOCUMENTS

| 4,815,741 | A  * | 3/1989  | Small     | A63F 3/081  |
|           |      |         |           | 463/17      |
| 6,554,184 | B1 * | 4/2003  | Amos      | G06Q 20/108 |
|           |      |         |           | 235/379     |
| 6,685,089 | B2 * | 2/2004  | Terranova | G06Q 20/00  |
|           |      |         |           | 235/381     |
| 6,789,733 | B2 * | 9/2004  | Terranova | G06Q 20/00  |
|           |      |         |           | 235/375     |
| 7,814,016 | B2 * | 10/2010 | Pranger   | G06Q 20/108 |
|           |      |         |           | 705/42      |
| 2001/0045457 | A1 * | 11/2001 | Terranova | G06Q 20/00 |
|              |      |         |           | 235/381    |
| 2003/0046230 | A1 * | 3/2003  | Jacobs    | G06Q 20/04 |
|              |      |         |           | 705/42     |
| 2009/0089193 | A1 * | 4/2009  | Paintin   | G06Q 20/02 |
|              |      |         |           | 705/34     |
| 2016/0132887 | A1 * | 5/2016  | Lacoss-Arnold | G07F 19/207 |
|              |      |         |           | 705/43     |

OTHER PUBLICATIONS

Armenise et al. "A Generative Solution for ATM Cash Management" Dec. 7-10, 2010; 2010 International Conference of Soft Coputing and Pattern Recognition, IEEE 2010.*
Boeschoten, Willem C. "Cash management, payment patterns and the demand for money." De economist 146.1 (1998): 117-142.*

* cited by examiner

Primary Examiner — Kelly S Campen
(74) Attorney, Agent, or Firm — Schwegman, Lundberg & Woessner

(57) ABSTRACT

A financial services center for use with a remote teller station. The financial services center comprises: a video interface for connecting to the remote teller station; and an ATM operable to dispense funds in response to commands received from (i) the remote teller station, and (ii) a transaction host. The ATM is operable to transmit a transaction update to the transaction host, where the transaction update provides information about funds dispensed in response to authorization from the remote teller station. This ensures that the transaction host receives information about funds dispensed in response to authorization received from each of the transaction host and the remote teller station.

7 Claims, 4 Drawing Sheets

FINANCIAL SERVICES CENTER ATM

FIELD OF INVENTION

The present invention relates to a financial service center (FSC), such as an FSC of the type used with a remote teller system.

BACKGROUND OF INVENTION

In a remote teller system, a financial services center is provided by a financial institution, and has a video link to a remote person (the remote teller). The video link is typically provided via a first network connection (typically an IP network so that it can support the high bandwidth requirements of video). The FSC includes various peripheral devices, such as a signature capture device, a passport reader, and a coin dispenser, to enable a wide range of financial services to be provided at the FSC.

The FSC also includes an automated teller machine (ATM) that is connected to a remote transaction host in a conventional manner, typically by a second network connection. The second network connection may comprise an IP network, or it may comprise a legacy network (such as an SNA network) that is not compatible with IP networks, and does not support the real-time video transmission needed for interaction with the remote teller.

One type of remote teller system is described in U.S. Pat. No. 7,814,016.

A customer at an FSC who wants to withdraw funds from his/her account has two options.

Firstly, the customer can use the ATM by inserting his/her ATM card and withdraw funds from his/her account in a conventional ATM transaction. The ATM dispenses cash to the ATM cardholder after obtaining authorization from the remote host (via the second network connection), without contacting the remote teller.

Secondly, the customer can receive cash from the FSC by authenticating him/herself to the remote teller. For example, the customer may present a driver's license to a video camera so that the remote teller can confirm that the customer is who he/she claims to be. Once authenticated, the customer can request dispensing of cash, and the remote teller can authorize dispensing of the requested amount by accessing the financial institution's account records. This is similar to what a teller at a conventional bank branch would do if a customer requested funds from his/her account. The remote teller can then instruct the ATM in the FSC to dispense funds to the customer. Thus, the ATM can receive a dispense funds instruction from either the remote teller or the remote host.

The ability to dispense funds in response to commands from two different sources has the disadvantage that that the remote host may not be aware of how much funds the ATM has dispensed because authorization to dispense some funds may have come from the remote teller rather than from the remote host.

If the remote host is not aware of how much funds have been dispensed by the ATM (within the FSC), then the remote host (or a management system that accesses the remote host to obtain information about the cash remaining in the ATM) may not schedule replenishment of the ATM in a timely manner. In other words, replenishment may not occur until the funds in the ATM have reached a critically low level, or have been fully dispensed.

There is also the problem of reconciling the funds dispensed by authorization from the remote teller and the funds dispensed by authorization from the remote host.

It would be helpful to obviate or mitigate one or more of the above disadvantages or other disadvantages associated with remote teller systems.

SUMMARY OF INVENTION

Accordingly, the invention generally provides methods, systems, apparatus, and software for a transaction system that updates one authorization system to indicate transactions authorized by another authorization system.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a financial services center for use with a remote teller station, the financial services center comprising: a teller interface for connecting to the remote teller station; and an automated teller machine operable to dispense funds in response to commands received from (i) the remote teller station, and (ii) a transaction host; wherein the automated teller machine is further operable to transmit a transaction update to the transaction host, where the transaction update provides information about funds dispensed in response to authorization from the remote teller station, thereby ensuring that the transaction host receives information about funds dispensed in response to authorization received from each of the transaction host and the remote teller station.

The transaction host may communicate with the automated teller machine using a defined message protocol. The defined message protocol may be an industry-standard message interface, such as IFX (Interactive Financial eXchange), ISO 8583, or the like; or a proprietary message interface, such as the NCR Direct Connect (NDC) message interface (from NCR Corporation (trade mark)), the 91x message interface provided by Diebold, Inc. (trade mark), or the like.

The ATM may be controlled remotely using the transaction host, which transfers a transaction flow (that is a sequence of screens together with the states associated with each of the screens) to the ATM. ATMs that are controlled remotely by a transaction host (rather than by an application executing on the ATM) are referred to herein as "state-driven ATMs".

Alternatively, the ATM may be controlled using a control application executing on the ATM.

The transaction update may comprise an existing defined message in the message protocol. For example, the transaction update may comprise a "Remove Cash" message. The transaction update may comprise: (i) a message identification (referred to as an operation code (or opcode) in some message protocols) corresponding to the Remove Cash message, and (ii) an amount corresponding to the number of banknotes of each denomination (and/or currency) that were dispensed by authorization from the remote teller location. Alternatively, in (ii), the amount may comprise the total value of the banknotes dispensed.

The transaction update may comprise multiple messages; for example, one message for each denomination dispensed in response to authorization from the remote teller station.

The transaction update may further comprise a field used to differentiate between a Remove Cash message initiated by a service person at the ATM (for example a replenisher), and a Remove Cash message initiated by the ATM itself to indicate funds dispensed by authorization from the remote teller station.

The ATM may send a transaction update after each dispense transaction authorized by the remote teller station. Alternatively, the ATM may wait until a predefined time (or a predefined number of dispense transactions) and then send a single transaction update that may include multiple transactions.

The advantage of using an existing defined message is that the software in the transaction host (which may be operated by a different entity to the entity that operates the FSC) does not need to be updated.

Alternatively, the transaction update may comprise a new defined message in the message protocol. The new defined message may include a message identification field and an amount field. In some message protocols, this may be implemented as a different (unique) value in the opcode field. The advantage of using a new defined message is that the transaction host can automatically recognize and process the transaction update. Using a new defined message would require the transaction host software to be updated to recognize the new defined message.

The financial services center may include a video conferencing facility to allow a customer at the financial services center to communicate with a remote teller at the remote teller station.

The ATM may allocate a float amount of cash to transactions authorized by the remote teller station. This float amount may be transmitted in the transaction update. Once the ATM has dispensed (in response to remote teller station authorized transactions) funds approaching this amount (or an amount of a denomination approaching the amount of that denomination provided in the float), then the ATM may allocate a new float amount of cash to transactions authorized by the remote teller station. In this way, the remote teller is allocated an amount of money (optionally including the numbers of each denomination that comprises the allocated amount of money), and can be allocated more money by the ATM once this amount (or nearly this amount) has been dispensed (or once one or more of the allocated denominations has been used up or depleted by a defined amount or to a defined level). The float amount of cash is analogous to a specific amount of money that is allocated to a point of sale terminal at the start of a shift in a retail store.

The ATM may reverse an allocation of cash in the event that the remote teller station does not use all of the cash originally allocated to it.

The ATM may monitor the amount of cash required by the remote teller station and may adjust the allocation of cash based on historical usage by the remote teller station.

This aspect has the advantage that the transaction host can keep accurate counts of the banknotes within an ATM, thereby enabling replenishment to be scheduled at the appropriate times.

If a new defined message is used, then the transaction host can automatically differentiate between transactions authorized by the remote teller station and transactions authorized by the transaction host.

If an existing defined message is used, then the transaction host can only differentiate between transactions authorized by the remote teller stations and transactions authorized by the transaction host if the transaction host software is updated. Alternatively or additionally, a remote management center (with updated software to identify a new entry or entries in one or more existing fields of the transaction update) can differentiate between host authorized transactions and remote teller authorized transactions based on one of the fields in the existing message.

Being able to keep accurate accounts has the additional advantage of enabling accurate reconciliation between transactions and the amount of money remaining in the ATM.

According to a second aspect there is provided a method of operating an ATM, the method comprising: receiving from a remote teller station a request to dispense funds; dispensing funds to a customer in response to the received request; preparing a transaction update comprising information about the funds dispense request received from the remote teller station; and transmitting the transaction update to a transaction host, which is different from the remote teller, to provide the transaction host with information about the funds dispensed by the ATM.

The step of preparing a transaction update may be implemented before, during, or after the step of dispensing funds to the customer.

The request from the remote teller may be received on a different communication channel than the communication channel used to transmit the transaction update to the transaction host. The two communication channels may use the same physical connection (for example, an IP network), but a different logical connection (for example, a different port number).

The transaction update may comprise an existing defined message in the message protocol. For example, the transaction update may comprise a "Remove Cash" message. The transaction update may further comprise a field used to differentiate between a Remove Cash message initiated by a service person at the ATM (for example a replenisher), and a Remove Cash message initiated by the ATM itself to indicate funds dispensed by authorization from the remote teller station.

The step of preparing a transaction update comprising information about the funds dispense request received from the remote teller station may include the sub-steps of preparing a transaction update comprising information about multiple funds dispense requests received from the remote teller station.

The ATM may send a transaction update after each dispense transaction authorized by the remote teller station. Alternatively, the ATM may wait until a predefined time (or a predefined number of dispense transactions) and then send a single transaction update that may include multiple transactions.

Alternatively, the transaction update may comprise a new defined message in the message protocol. The new defined message may include a message identification field and an amount field.

According to a third aspect there is provided a method of operating an ATM, the method comprising: preparing a transaction update comprising information about funds in the ATM that are allocated to a remote teller station; transmitting the transaction update to a transaction host, which is different from the remote teller, to provide the transaction host with information about the funds allocated to the remote teller station; receiving from the remote teller station a command to dispense funds; dispensing funds to a customer in response to the received command; and deducting the funds dispensed from the amount of funds allocated to the remote teller station to maintain a record of funds dispensed in response to commands received from the remote teller station.

The amount of funds allocated to the remote teller station may be referred to as a float amount. Once the ATM has dispensed more than this amount (or more than any of the denomination amounts provided in the float amount), then the ATM may allocate a new float amount of cash to transactions authorized by the remote teller station. In this way, the remote teller is allocated an amount of money (optionally including the numbers of each denomination that comprises the amount of money), and can inform the ATM of the need for more money once this amount has been dispensed (or once one or more of the allocated denominations has been used up).

Similarly, the ATM may reverse (in part) an allocation of a float if the remote teller has not used the full amount of the float within a predefined time period.

The ATM may dynamically calculate the amount of funds that should be allocated to the remote teller system based on historical use within that ATM.

The method of the second and third aspects may be implemented by a processor in the ATM.

Computer readable media (a USB device, a hard drive, or the like) may be used to store instructions that can be used to implement the steps of the second and third aspects of the invention.

According to a fourth aspect there is provided a financial institution network comprising: a remote teller station; a financial services center coupled to the remote teller station by a network and including an automated teller machine; and a transaction host coupled to the financial services center by another network implementing a financial message interface; the automated teller machine including a processor operable to implement the steps of the second or third aspects.

The financial institution network may further comprise a network management center connected to the financial services center.

According to a fifth aspect there is provided a financial services center for use with a remote teller station, the financial services centre comprising: a video interface for connecting to the remote teller station; and an automated teller machine operable to dispense funds in response to commands received from (i) the remote teller station, and (ii) a transaction host; wherein the automated teller is operable to assign at least one currency cassette to the remote teller station, and at least one currency cassette to the transaction host, so that the ATM does not report the contents of the at least one remote teller station assigned currency cassette to the transaction host.

The ATM may assign a plurality of currency cassettes to the remote teller station, and a plurality of currency cassettes to the transaction host.

According to a sixth aspect there is provided an automated teller machine operable to receive commands for dispensing funds from (i) a first authorization system, and (ii) a second authorization system; wherein the automated teller is operable to assign at least one currency cassette for exclusive use by the first authorization system, and at least one currency cassette for exclusive use by the second authorization system.

The first authorization system may comprise a remote teller station. The second authorization system may comprise an ATM transaction host.

According to a seventh aspect there is provided a financial services center for use with a first authorization system, the financial services center comprising: an authorization interface for connecting to the first authorization system; and an automated teller machine operable to dispense funds in response to commands received from (i) the first authorization system, and (ii) a second authorization system; wherein the automated teller machine is further operable to transmit a transaction update to the second authorization system, where the transaction update provides information about funds dispensed in response to authorization from the first authorization system, thereby ensuring that the second authorization system receives information about funds dispensed in response to authorization received from each of the first and second authorization systems.

The first authorization system may comprise a remote teller system.

The second authorization system may comprise an ATM transaction host.

For clarity and simplicity of description, not all combinations of elements provided in the aspects recited above have been set forth expressly. Notwithstanding this, the skilled person will directly and unambiguously recognize that unless it is not technically possible, or it is explicitly stated to the contrary, the consistory clauses referring to one aspect are intended to apply mutatis mutandis as optional features of every other aspect to which those consistory clauses could possibly relate.

These and other aspects will be apparent from the following specific description, given by way of example, with reference to the accompanying drawings.

DETAILED DESCRIPTION

Figure 1:
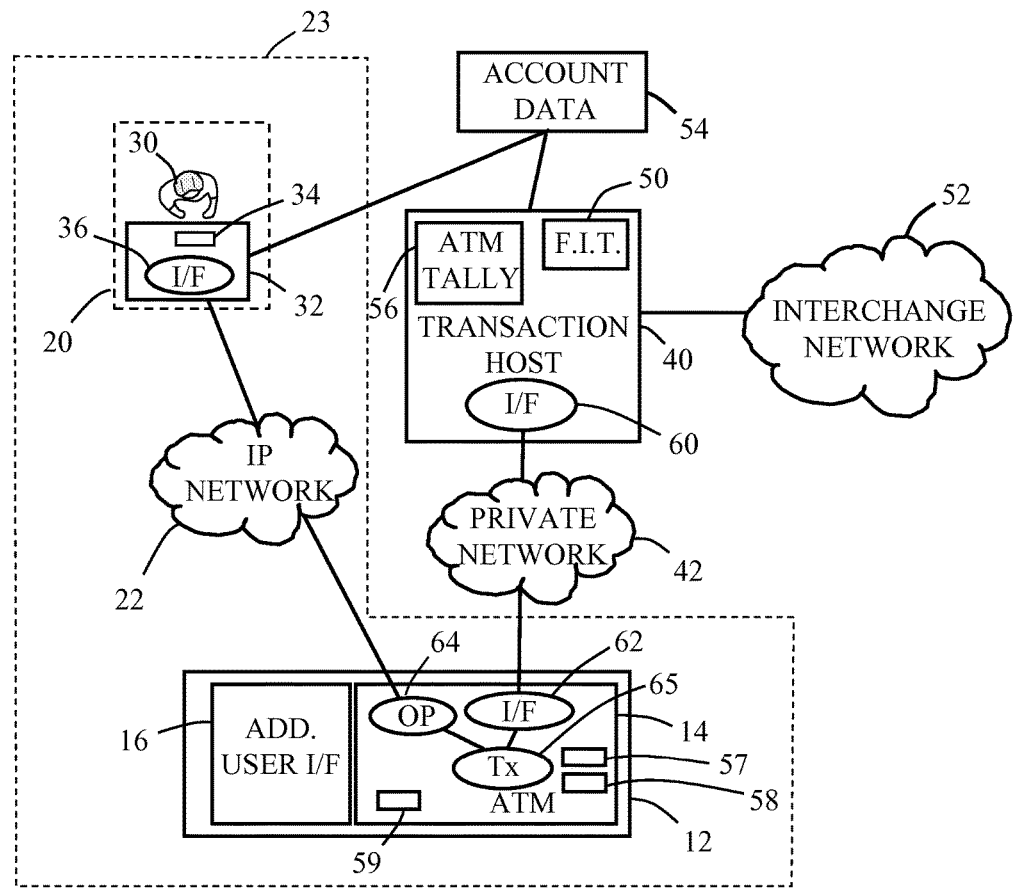
FIG. 1 is a simplified schematic diagram of a financial network including a remote teller system according to one embodiment of the present invention.

Reference is first made to FIG. 1, which is a simplified schematic diagram of a financial network 10 including a remote teller system according to one embodiment of the present invention. In particular, in FIG. 1, the financial network 10 comprises: a financial services center (FSC) 12 comprising an automated teller machine (ATM) 14 augmented with a sidecar 16 comprising additional user interface elements. Although not illustrated, these additional user interface elements include a display, a video camera (including a microphone), a loudspeaker, a coin dispenser, a handwriting digitizer, a full QWERY keyboard, a passbook reader, and other peripherals.

The financial network 10 further comprises: a remote teller location 20 coupled to the FSC 12 by an IP network 22 that supports video conferencing. These three components (the FSC 12, the remote teller location 20, and the IP network 22) are referred to collectively as a remote teller system 23.

A human teller (indicated by numeral 30) is located at the remote teller location 20, and operates a teller station 32 located therein. Although only one human teller 30 and one teller station 32 are illustrated, the remote teller location 20 may comprise a plurality of human tellers and a plurality of teller stations. The remote teller location 20 may serve many different FSCs 12 that are dispersed over a wide geographical area.

The teller station 32 includes a control interface 34 to allow the human teller 30 to communicate with a customer at the FSC 12 and to control the operation of the FSC 12 (including the ATM 14). Although not illustrated in detail, the control interface 34 includes: a video camera, a loudspeaker, a microphone, a teller display (illustrating the status of components within the FSC 12). The teller station 32 executes control software 36 to enable the human teller 30 to control the FSC operation remotely. This control software 36 includes a defined interface (referred to herein as the teller interface).

The financial network 10 further comprises a transaction host 40. The transaction host 40 communicates with the ATM 14 via a private network 42. In this embodiment, the private network is a legacy SNA network, but in other embodiments it could be an IP network. The purpose of the transaction host 40 is to authorize transactions requested by the ATM 14 and to control the operation of the ATM 14.

The transaction host 40 includes a financial institution table (FIT) 50 that stores information about different financial institutions. This ensures that if an ATM cardholder from a different bank to the owner of the financial network 10 requests a transaction at the ATM 14 (a so-called "not-on-us" transaction), then the transaction host 40 can use the FIT 50 to identify the relevant bank and route the transaction request to the appropriate transaction host for that bank. This routing is done through interchange networks 52.

If the transaction request at the ATM 14 relates to a customer of the bank that owns the FSC 12, then the transaction host 40 accesses an account server 54 of that bank. The account server 54 stores all of the bank account details of the bank's customers. This account server 54 is accessed by: (i) branch staff for counter transactions, (ii) the remote tellers 30 for FSC transactions, and (iii) the transaction host 40 for ATM transactions.

The transaction host 40 also stores some management information 56, which includes information about how much cash remains in each ATM 14 in the network 10 (although only one ATM is illustrated in FIG. 1 for clarity).

The ATM 14 includes two currency cassettes 57,58 in this embodiment. This first currency cassette 57 stores twenty dollar bills (as used in this description the words "bill" and "banknote" are synonymous), and the second currency cassette 58 stores ten dollar bills. In this embodiment, the ATM 14 maintains a data file 59 that records how many bills have been dispensed from each cassette 57,58, and how many bills remain in each cassette 57,58. Other embodiments may not include the data file 59 because the transaction host 40 maintains this information.

In this embodiment, the transaction host 40 controls the ATM 14 by transmitting screens (data, graphics, and controls for rendering on the ATM customer display) to the ATM 14, by instructing the ATM 14 to display a screen in response to an event or activity occurring at the ATM 14, and by instructing the ATM 14 to perform certain actions (for example, to dispense a defined amount of cash). This is implemented using a defined message interface 60 executed by the transaction host 40 to send messages according to a defined protocol.

In addition to including ATM software, the ATM 14 also includes a message interface 62 implementing the same message protocol as the transaction host message interface 60. The ATM 14 also executes (i) an operational program 64 that communicates with the teller interface in the control software 36, and (ii) a transaction program 65, which implements transactions in response to messages received via the message interface 62 (that is, from the transaction host 40) or the operational program 64. The operational program 64 receives transaction instructions from the teller interface in the control software 36 (that is, from the teller station 32).

In this first embodiment, the message protocol is based on an existing message protocol (the NDC protocol from NCR Corporation). The general format of an NDC message (shown in simplified form) is illustrated in FIG. 2.

Figure 2:
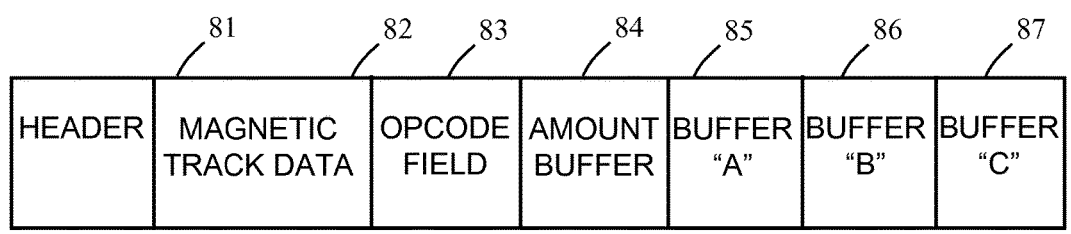
FIG. 2 is a diagram illustrating a simplified data structure of a message protocol used in the financial network of FIG. 1.

Referring now to FIG. 2, an NDC message 80 comprises: a header field 81, a magnetic track data field 82, an opcode field 83, an amount buffer 84, and three additional buffer fields (buffers "A" 85, "B" 86, and "C" 87). These three buffers can be used for different types of information.

First Embodiment

In this embodiment, an existing NDC message, the Remove Cash message, is used as a transaction update to provide the transaction host 40 with details of transactions executed at the FSC 12 in response to authorizations from the remote teller location 20. It should be appreciated that the Remove Cash message is a pre-existing message that may be used by a supervisor (someone authorized to access administrative functions of the ATM 14) to indicate that cash has been removed from the ATM 14.

In the Remove Cash message, the header 81 indicates that this message relates to a transaction request. The magnetic stripe data field 82 includes a data string that relates either to: (i) the supervisor (when the message is used to indicate that a supervisor has removed cash in a traditional manner), or (ii) a defined data string that is only used when this command is initiated by the ATM 14 in response to a cash dispense transaction authorized by the remote teller location 20. Thus, by analyzing the magnetic strip data field 82 it is possible to ascertain if this message was sent in response to supervisor activity or a transaction authorized by the remote teller 30.

In the Remove Cash message, the opcode field 83 includes a combination of bytes that indicate the transaction type (that is, that cash has been removed from ATM cassettes), and bytes that indicate the particular cassette from which the cash has been removed.

In the Remove Cash message, the amount buffer field 84 indicates the amount of cash that has been removed. This may be indicated as a total amount, or as the number of banknotes removed and the denomination of each banknote.

Buffers "B" and "C" are not used in the Cash Remove message.

In use, a customer may stand at the FSC 12 and communicate by video conference (provided by the sidecar 16) with the human teller 30. Once the customer has been identified by the human teller 30 (for example, by the customer holding a driver license or an account book in front of the video camera in the sidecar 16), then the customer may request cash withdrawal. The remote teller 30 can access the account server 54 to confirm that the customer has sufficient funds in his/her account, and then instruct the ATM 14 (via the teller interface in the control software 36) to dispense the requested cash. Once the ATM 14 has dispensed the amount of cash requested, and confirmed to the teller station 32 that this transaction has been completed, then the ATM 14 sends a transaction update to the transaction host 40. In this embodiment, the transaction update is in the form of one or more Remove Cash messages. Multiple Remove Cash Messages are required where more than one denomination has been dispensed under authorization from the teller system 32.

The ATM 14 populates the Remove Cash message. In particular, the magnetic stripe data field 82 is populated with a defined data string identifying that a teller location 20 was the entity that authorized the cash dispense operation. The identity of the cassette that was used to fulfill the dispense request is added to the opcode field 83, and the amount dispensed is added to the amount buffer 84.

The Remove Cash message is then sent to the transaction host 40.

The transaction host 40 uses this message to update the management information 56. This enables the transaction host 40 to keep an accurate tally of the amount of cash remaining in each ATM 14 in the financial network 10.

The transaction host 40 may use this information to schedule cash replenishment operations, or may provide this information to a remote management center (not shown) that is responsible for managing the ATMs in the financial network 10, or to a replenisher at the ATM 14.

Second Embodiment

Figure 3:
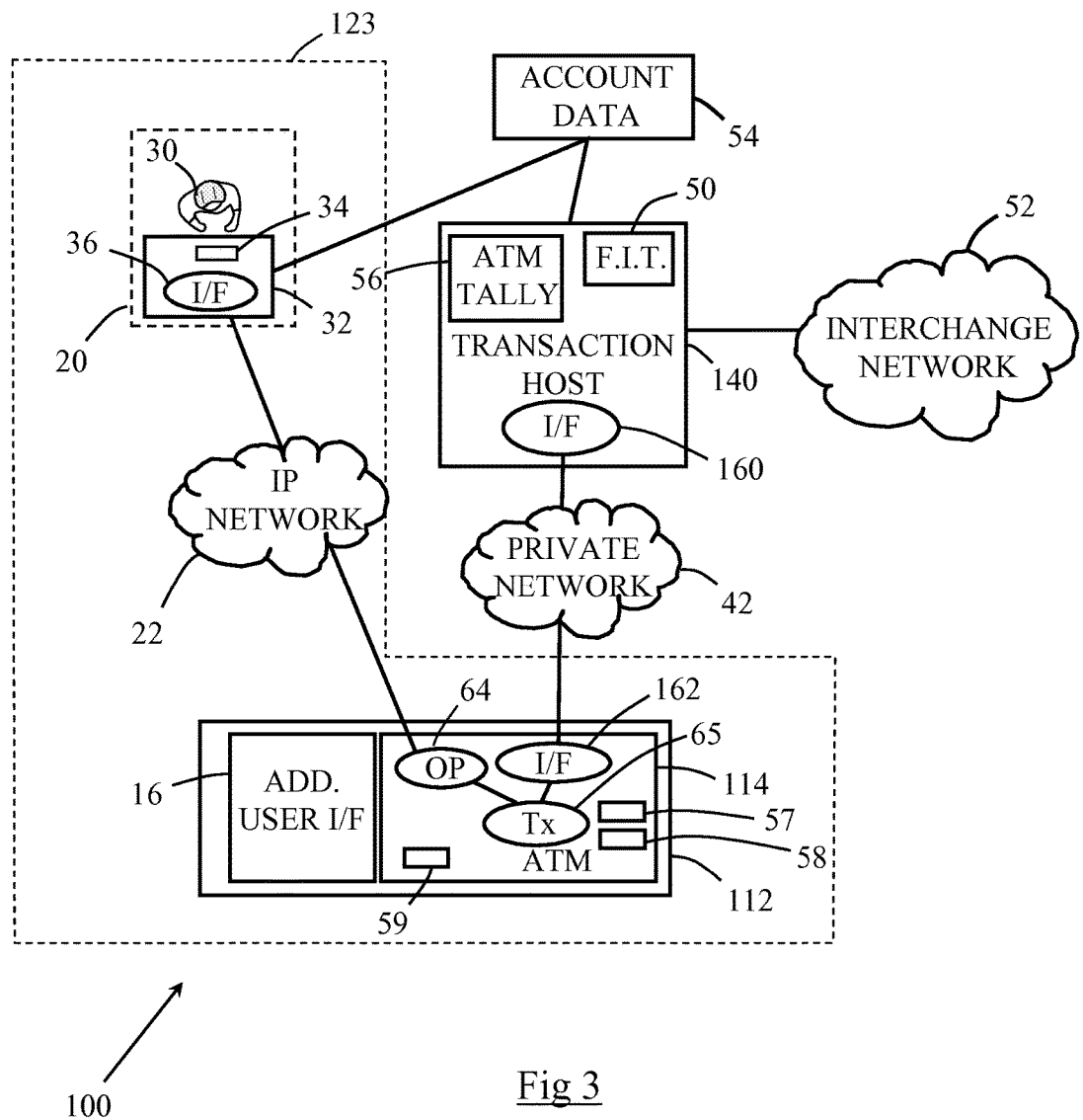
FIG. 3 is a simplified schematic diagram of a financial network including a remote teller system according to a second embodiment of the present invention.

Reference will now be made to FIG. 3, which is a simplified schematic diagram of a financial network 100 including a remote teller system 123 according to a second embodiment of the present invention;

In this embodiment, a new NDC message is provided that is only used to indicate that cash has been dispensed in response to a request from a remote teller. It is a different message to the Remove Cash message. In this embodiment, this new message is referred to as the Teller Dispense message.

The Teller Dispense message has the same general format as the NDC data structure shown in FIG. 2.

The primary difference between the Teller Dispense message and the Remove Cash message is that a different combination of bytes is used in the opcode field 83 in each of these messages. The Remove Cash message uses an existing combination of bytes assigned to that message. The Teller Dispense message uses a new combination of bytes (not used by any other message in that implementation of the NDC protocol). The other fields in the Teller Dispense message are similar to the corresponding fields in the Remove Cash message. One other difference is that the Teller Dispense message may use Buffers A, B and/or C (in addition to the amount buffer 84) to list different denominations. Thus, a single Teller Dispense message may list four different denominations (if four denominations were dispensed in a transaction); whereas, the Remove Cash message would require up to four different messages, one for each denomination.

A newly-defined message may even allow multiple denominations to be listed in one buffer (for example, the amount buffer 84).

In use, a customer may stand at the FSC 112 and communicate by video conference with the human teller 30. Once the customer has been identified by the human teller 30 (for example, by the customer holding a driver license or an account book in front of the video camera in the sidecar 16), then the customer may request cash withdrawal. The remote teller 30 can access the account server 54 to confirm that the customer has sufficient funds in his/her account, and then instruct the ATM 114 (via the control software 36) to dispense the requested cash.

Once the ATM 114 has dispensed the amount of cash requested, and confirmed to the teller station 32 that this transaction has been completed, then the ATM 114 sends a transaction update to the transaction host 140. The ATM 114 includes an updated message interface 162 that supports the transaction update. In this embodiment, the transaction update is in the form of a Teller Dispense message. The transaction host 140 uses an updated message interface 160 to parse the Teller Dispense message and update the management information 56 accordingly. Although interfaces 160 and 162 are described as new interfaces; the data structures are the same as for interfaces 60 and 62, the main difference is that when additional data is populated in the data structure (for example, the opcode relating to a Teller Dispense message) the message interface 160 can automatically recognize this.

Third Embodiment

Figure 4:
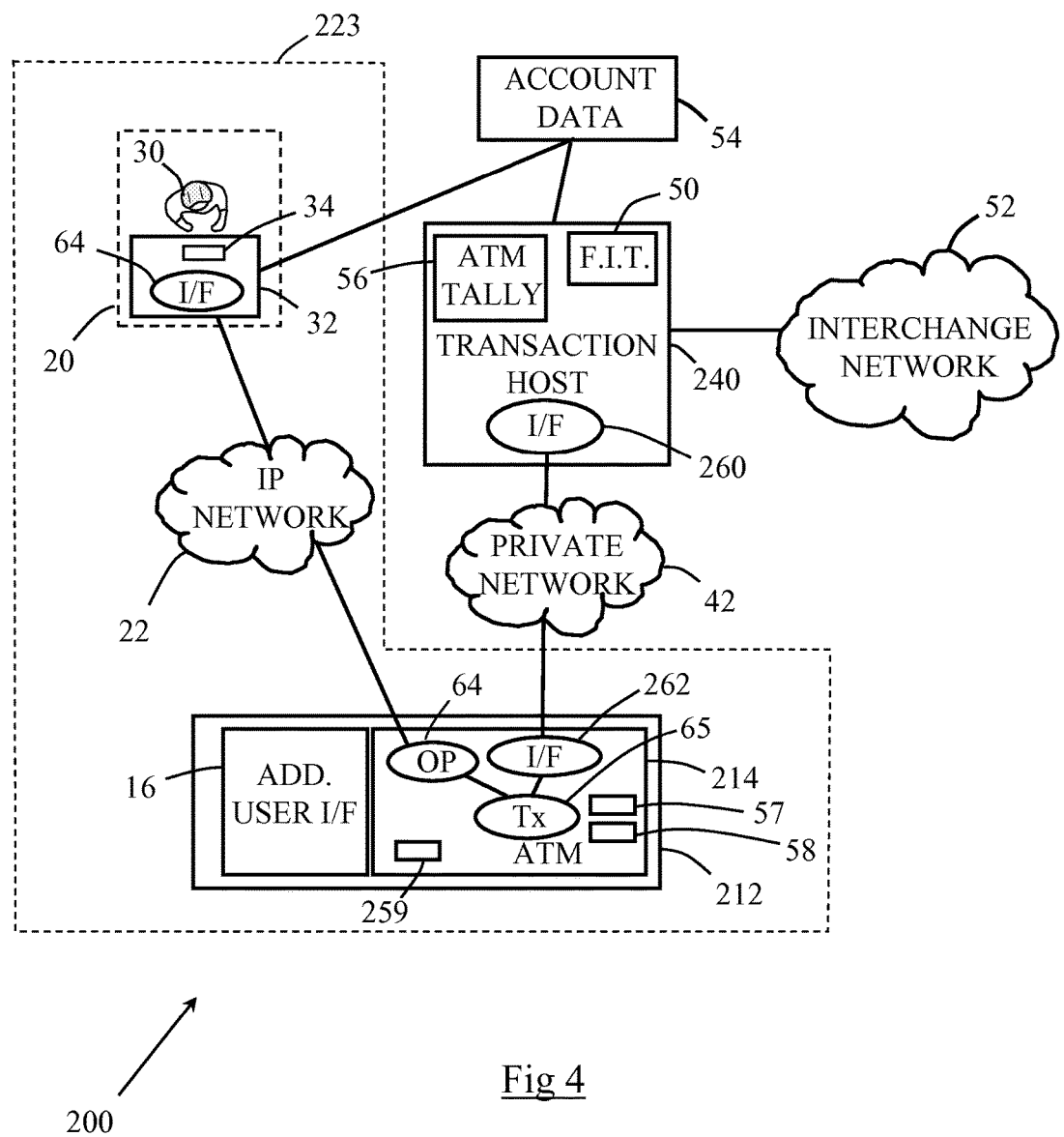
FIG. 4 is a simplified schematic diagram of a financial network including a remote teller system according to a third embodiment of the present invention.

Reference will now be made to FIG. 4, which is a simplified schematic diagram of a financial network 200 including a remote teller system 223 according to a third embodiment of the present invention;

In this embodiment, the ATM 214 allocates an amount of cash (also referred to as a "float") to transactions authorized from the remote teller location 20.

In this example, the ATM 214 allocates five thousand dollars to be controlled by the teller station 32, in the form of two hundred twenty dollar bills and one hundred ten dollar bills. All of the ATM's twenty dollar bills (whether allocated to the teller station 32 or not) are stored in the first currency cassette 57. Similarly, all of the ATM's ten dollar bills (whether allocated to the teller station 32 or not) are stored in the second currency cassette 58. It should be appreciated that those banknotes that are allocated to the teller station 32 are not separated (or even distinguishable) from the other banknotes in each currency cassette 57,58. In other words, it is a logical allocation of banknotes, not a physical allocation of banknotes.

The ATM 214 then sends a message to the transaction host 240 to indicate the number of banknotes that have been allocated to the teller station 32. This message serves as a transaction update, even though it may cover many transactions.

Any of the previous types of message (for example, the Remove Cash message, the Teller Dispense message), or even another type of message (for example, a Batch Allocation message), may be selected for use by the ATM 214 to indicate to the transaction host 240 the number and/or value of banknotes allocated to the teller station 32. In this embodiment, a new message called a Batch Allocation message is used. This message is very similar to the Teller Dispense message, but differs in that the opcode field 83 includes another unique combination of bytes that is not used by any other messages defined in the message interfaces 60,62.

The ATM 214 uses an updated data file 259 to record a tally of banknotes allocated to the teller station 32. Updated data file 259 also records how many bills have been dispensed from each cassette 57,58, and how many bills remain in each cassette 57,58.

This tally in data file 259 is initially set to the allocation; that is 200 twenty dollar bills and 100 ten dollar bills. Each time the teller station 32 instructs the ATM 214 to dispense cash, the ATM 214 decrements the twenty dollar bill count and/or the ten dollar bill count, as appropriate. For example, if the first cash dispense transaction instructed by the teller station 32 is for the ATM 214 to dispense a hundred dollars as four twenty dollar bills and two ten dollar bills, then the ATM 214 would dispense the requested cash, confirm to the teller station 32 that the cash was dispensed as requested, and then update the data file 259. In this example, the number of twenty dollar bills would be decremented by four to 196, and the number of ten dollar bills would be decremented by two to 98.

When the twenty dollar bill count and/or the ten dollar bill count falls below a predetermined number (for example ten bills) then the ATM 214 allocates more bills to transactions authorized from the remote teller location 20. In other words, the ATM 214 increases the float, then sends a message to the transaction host 240 indicating the number and/or value of banknotes added to the float.

The ATM 214 includes an updated message interface 262 that supports the Batch Allocation message, and the transaction host 240 also includes an updated message interface 260 that supports the Batch Allocation message.

This embodiment has the disadvantage that banknotes are reported to the transaction host 240 as removed, even though they still remain in the ATM currency cassettes 57,58. Thus, the total number of banknotes in the ATM 214 as recorded by the transaction host 240 is lower than the actual number for long periods of time. For this reason, it may be desirable to use a relatively low value of allocation. Alternatively, the ATM 214 may only report the allocated banknotes once the teller station 32 has dispensed all (or most) of those banknotes. For example, the ATM 214 may only report banknotes as dispensed when another allocation to the teller station 32 is required. This has the disadvantage that the total number of banknotes in the ATM 214 as recorded by the transaction host 240 is higher than the actual number for long periods of time.

In variants of this third embodiment, the transaction host 240 may record banknotes listed in Batch Allocation messages as potentially dispensed rather than as dispensed. This would allow the transaction host 240 (or a management center receiving data from the transaction host 240) to estimate the number of banknotes remaining in the ATM 214 based on when the Batch Allocation message was received and the average amount of cash dispensed per hour in response to authorizations from the remote teller location 20.

The ATM's updated message interface 262 (and the transaction host's updated message interface 260) also support a Reverse Batch Allocation message. This allows the ATM 214 to reverse part (or all) of an allocation in the event that some of the allocated funds were not dispensed under authorization from the teller station 32. This may be performed by the ATM 214 prior to a replenishment operation or a reconciliation operation, so that all of the banknotes in the ATM 214 are accounted for.

Fourth Embodiment

Figure 5:
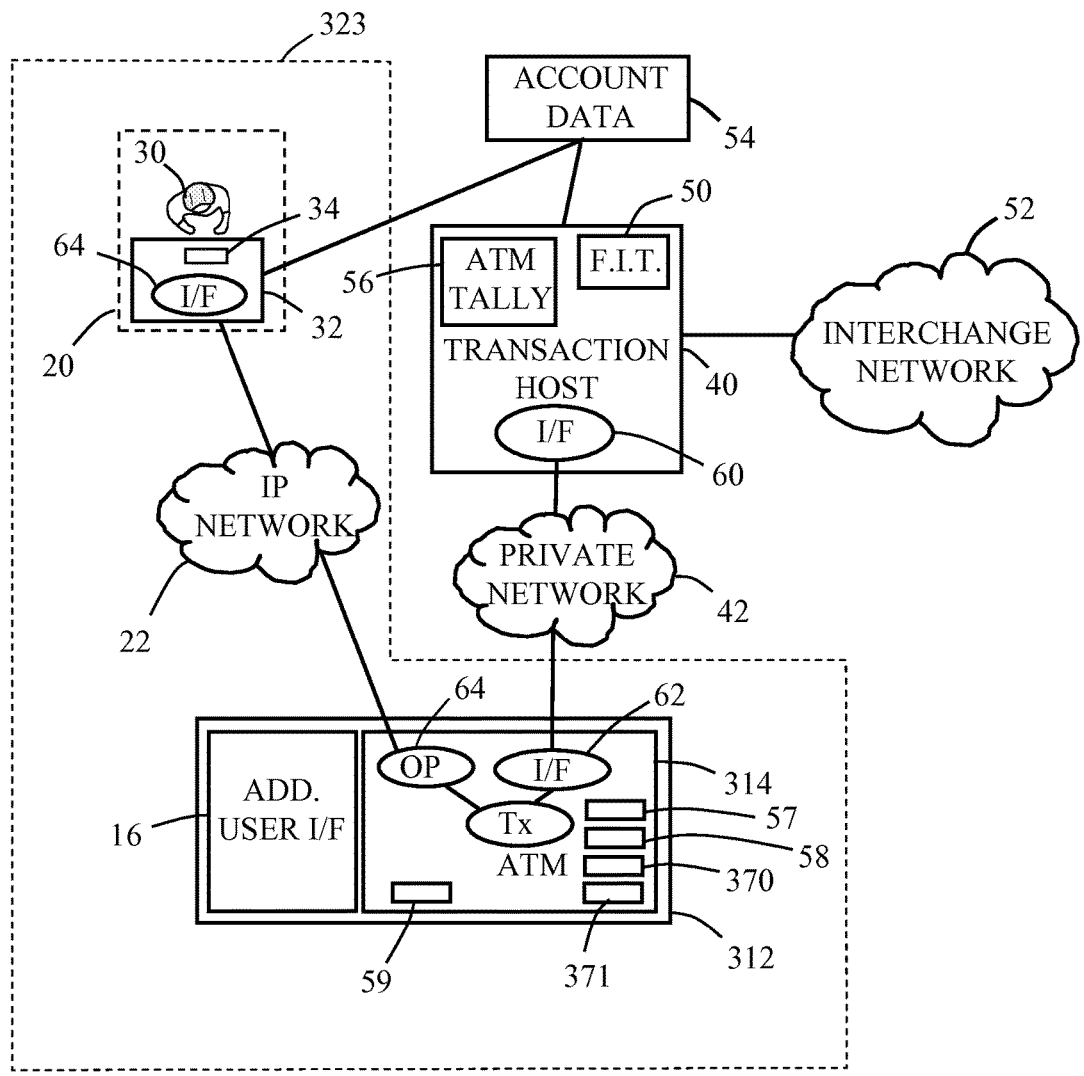
FIG. 5 is a simplified schematic diagram of a financial network including a remote teller system according to a fourth embodiment of the present invention.

Reference will now be made to FIG. 5, which is a simplified schematic diagram of a financial network 300 including a remote teller system 323 according to a fourth embodiment of the present invention.

In this embodiment, the ATM 314 comprises four currency cassettes 57,58,370, and 371. Two of these currency cassettes 57,58 are assigned exclusively for transactions authorized by the transaction host 40, the other two 370,371 are assigned exclusively for transactions authorized by the remote teller station 32. In other words, all cash dispense transactions authorized by the transaction host 40 are fulfilled by currency cassettes 57 and 58; whereas, all cash dispense transactions authorized by the remote teller station 32 are fulfilled by currency cassettes 370 and 371.

The ATM 314 maintains counts for all of the cassettes 57,58,370,371, in the data file 59; however, the ATM 314 only reports to the transaction host 40 details of banknotes dispensed from the two currency cassettes 57,58 associated with transactions authorized by the transaction host 40.

Monitoring of the banknotes dispensed from (and remaining in) the two cassettes 370,371 controlled by the remote teller station 32 would also be performed by the remote teller station 32. The remote teller station 32 may communicate this information to a remote management center (not shown) to enable the remote management center (not shown) to schedule replenishment of those cassettes 370,371. Alternatively, the two cassettes 370,371 controlled by the remote teller station 32 (in the sense of being dedicated to transactions authorized by the remote teller station 32) may be replenished each time the other two cassettes 57,58 are replenished.

Various modifications may be made to the above described embodiments within the scope of the invention, for example, in other embodiments, the ATM and sidecar may be provided as a single integrated unit.

In other embodiments, the account server 54 may be incorporated into the transaction host.

The names given to the transaction update messages described above are merely to give the reader an indication of the function performed by those messages.

The data structure of the messages listed above is only one example; the data structure used could be selected from many different data structures.

The number of cassettes described above is not limiting. A greater or smaller number may be used. Similarly, U.S. dollars were described as the currency, but other currencies, or multiple different currencies, may be used.

The protocol described above is the NCR NDC protocol. However, in other embodiments, a different protocol may be used.

In other embodiments, an FSC may receive authorization from a second source other than a remote teller location.

The steps of the methods described herein may be carried out in any suitable order, or simultaneously where appropriate. The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

Unless otherwise indicated by the context, the terms "a" and "an" are used herein to denote at least one of the elements, integers, steps, features, operations, or components mentioned thereafter, but do not exclude additional elements, integers, steps, features, operations, or components.

The presence of broadening words and phrases such as "one or more," "at least," "but not limited to" or other similar phrases in some instances does not mean, and should not be construed as meaning, that the narrower case is intended or required in instances where such broadening phrases are not used.

The reader's attention is directed to all papers and documents which are filed concurrently with or previous to this specification in connection with this application and which are open to public inspection with this specification, and the contents of all such papers and documents are incorporated herein by reference.

What is claimed is:

1. A system, comprising:
   a remote teller station including:
      a processor and a non-transitory computer-readable storage medium having executable instructions representing a teller interface, wherein the processor executes the teller interface from the non-transitory computer-readable storage medium on the remote teller station;
   an Automated Teller Machine (ATM) includes an ATM processor and an ATM non-transitory computer-readable storage medium having ATM executable instructions, wherein the ATM executable instructions when executed by the ATM processor from the ATM non-transitory computer-readable storage medium is configured to perform processing to:
      dispense first funds, during a teller assisted transaction at the ATM, and in response to first commands received from the remote teller station through the teller interface and using a first communication channel for interaction with the remote teller station;
      dispense second funds in response to second commands received from a transaction host over a second a second communication channel during a self-service transaction;
      transmit a transaction update to the transaction host using the second communication channel, wherein the transaction update indicating that the first funds have been dispensed during the teller assisted transaction, and wherein the transaction host is unaware of the first funds being dispensed from the ATM until receipt of the transaction update by the transaction host, and wherein the transaction update includes:
         an operation code representing a remove-cash operation performed by the ATM with the teller assisted transaction;
         a first amount associated with the first funds and first denominations that were dispensed with the first funds from the ATM with the teller assisted transaction; and
         a field that is set indicating that the first funds were initiated by the remote teller station and not by a service person that services the ATM;
      and
      communicate with the transaction host through a message protocol;
   the transaction host comprises a transaction processor and a transaction non-transitory computer-readable storage medium having transaction executable instruction that when executed by the transaction processor from the transaction non-transitory computer-readable storage medium is configured to cause the transaction processor to:
      communicate with the executable instructions of the ATM through the message protocol over the second communication channel;
      maintain a funds level for available funds that are available to be dispensed from the ATM, and wherein the funds level includes denominations for each of the available funds; and
      remotely controlling transaction flows on the ATM using the message protocol to provide transaction flows for transactions as a sequence of screens together with states associated with each screen to the executable instructions of the ATM to operate the ATM as a state-driven ATM
   wherein the remote teller station is different from the transaction host
   wherein the ATM interacts with the remote teller station over the first communication channel that is separate and different from the second communication channel that the ATM uses to interact with the transaction host.

2. The system of claim 1, wherein the ATM is configured to be remotely controlled through the transaction host, and the transaction host is configured to transfer a transaction process flow to the ATM for processing.

3. The system of claim 1, wherein the ATM is configured to send a particular transaction update after each dispense transaction is authorized by the remote teller station.

4. The system of claim 1, wherein the ATM is configured to wait until a predefined time and send a single transaction update that may include multiple transactions.

5. The system of claim 1, wherein the ATM is configured to allocate a float amount of cash for future transactions to be authorized by the remote teller station and transmit the float amount as a particular transaction update.

6. The system of claim 1, wherein the transaction host is configured to communicate with the ATM using a defined message protocol.

7. The system of claim 6, wherein the transaction update comprises an existing defined message in the defined message protocol.

* * * * *